(12) United States Patent
Funakoshi et al.

(10) Patent No.: US 9,971,207 B2
(45) Date of Patent: May 15, 2018

(54) LIQUID CRYSTAL DISPLAY DEVICE

(71) Applicant: Japan Display inc., Tokyo (JP)

(72) Inventors: Hirofumi Funakoshi, Tokyo (JP); Jin Hirosawa, Tokyo (JP); Masakatsu Kitani, Tokyo (JP); Daichi Hosokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days. days.

(21) Appl. No.: 15/295,121

(22) Filed: Oct. 17, 2016

(65) Prior Publication Data

US 2017/0146846 A1 May 25, 2017

(30) Foreign Application Priority Data

Nov. 24, 2015 (JP) .................. 2015-228720

(51) Int. Cl.
*G02F 1/1339* (2006.01)
*G02F 1/1335* (2006.01)
*G02F 1/1343* (2006.01)
*G02F 1/1362* (2006.01)
*G02F 1/1368* (2006.01)

(52) U.S. Cl.
CPC ........ *G02F 1/13394* (2013.01); *G02F 1/1368* (2013.01); *G02F 1/133512* (2013.01); *G02F 1/133514* (2013.01); *G02F 1/134336* (2013.01); *G02F 1/136227* (2013.01); *G02F 1/136286* (2013.01); *G02F 1/134363* (2013.01); *G02F 2001/13396* (2013.01); *G02F 2201/123* (2013.01)

(58) Field of Classification Search
CPC ....................... G02F 1/13394; G02F 1/136227

USPC .................... 349/42, 43, 155–157
See application file for complete search history.

(56) References Cited

U.S. PATENT DOCUMENTS

| | | | | |
|---|---|---|---|---|
| 5,253,091 A * | 10/1993 | Kimura | ............... | G09G 3/3648 345/87 |
| 5,790,092 A * | 8/1998 | Moriyama | ........... | G09G 3/3648 345/209 |
| 8,144,279 B2 * | 3/2012 | Tsubata | ............. | G02F 1/133707 349/43 |

(Continued)

FOREIGN PATENT DOCUMENTS

JP         2013-007955 A       1/2013

*Primary Examiner* — Thanh-Nhan P Nguyen
(74) *Attorney, Agent, or Firm* — Typha IP LLC

(57) ABSTRACT

A liquid crystal display device related to one embodiment includes a gate line arranged along a first direction, a first pixel including a first switching element connected to the gate line, and a first pixel electrode connected to the first switching element via a first contact hole arranged in an insulation layer, a second pixel including a second switching element connected to the gate line, and a second pixel electrode connected to the second switching element via a second contact hole arranged in the insulation layer, a first spacer arranged in the fixed pixel, and a second spacer arranged in the second pixel, wherein the first spacer and the second spacer are arranged substantially on the same straight line in the first direction, and the first contact hole and the second contact hole are alternately arranged sandwiching a straight line connecting the first spacer and the second spacer.

11 Claims, 8 Drawing Sheets

(56) References Cited

U.S. PATENT DOCUMENTS

2012/0092596 A1* 4/2012 Cho .................. G02F 1/13394
                                                    349/106
2012/0327338 A1   12/2012 Kobayashi et al.

* cited by examiner

LIQUID CRYSTAL DISPLAY DEVICE

CROSS-REFERENCE TO RELATED APPLICATIONS

This application is based upon and claims the benefit of priority from the prior Japanese Patent Application No. 2015-228720, filed on Nov. 24, 2015, the entire contents of which are incorporated herein by reference.

FIELD

The present invention is related to a liquid crystal display device.

BACKGROUND

A display screen of various electronic devices such as personal computers, tablets and smartphones is formed using a display device called a flat panel display. Liquid crystal display devices which use the electro-optical effects of a liquid crystal material are becoming widespread as a display device used in such electronic devices. A liquid crystal display device is largely divided into a vertical field effect type and transverse field effect type depending on the structure of a pixel electrode. The practical use of a transverse field effect type has progressed in recent years.

A transverse field effect type liquid crystal display device includes a structure arranged with a liquid crystal layer. A liquid crystal layer is arranged between a first substrate arranged with a pixel electrode and common electrode, and a second substrate arranged with a color filter layer arranged opposing the first substrate. A spacer is arranged between the first substrate and second substrate. A light blocking layer is arranged so as to hide an outline of a pixel as the spacer (for example, Japanese Laid Open Patent Publication No. 2013-007955).

In a liquid crystal display device, since it is necessary to maintain a fixed interval (called a [cell gap]) between a first substrate arranged with a liquid crystal layer and a second substrate, a plurality of column shaped spacers is arranged in a pixel part arranged with pixels. Since a contact hole which connects a pixel electrode with lower layer wiring is arranged in the pixel part, it is ideal that the column shaped spacer is arranged as much as possible apart from the contact hole. However, the greater the development in high definition of a pixel, the closer the arrangement of a column shaped spacer and contact holes becomes. In this case, there is greater demand for bonding precision of a first substrate and second substrate. For example, when a column shaped spacer falls into a contact hole due to misalignment, a cell gap is no longer uniform, and color shit and color unevenness occurs which is cause of a decrease in image quality.

SUMMARY

According to one embodiment of the present invention, a liquid crystal display device is provided including a gate line arranged along a first direction, a first pixel including a first switching element connected to the gate line, and a first pixel electrode connected to the first switching element via a first contact hole arranged in an insulation layer, a second pixel including a second switching element connected to the gate line, and a second pixel electrode connected to the second switching element via a second contact hole arranged in the insulation layer, a first spacer arranged in the fixed pixel, and a second spacer arranged in the second pixel, wherein the first spacer and the second spacer are arranged substantially on the same straight line in the first direction, and the first contact hole and the second contact hole are alternately arranged sandwiching a straight line connecting the first spacer and the second spacer.

DESCRIPTION OF EMBODIMENTS

The embodiments of the present invention are explained below while referring to the diagrams. However, it is possible to perform the present invention using various different forms, and the present invention should not be limited to the content described in the embodiments exemplified herein. Although the width, thickness and shape of each component are shown schematically compared to their actual form in order to better clarify explanation, the drawings are merely an example and should not limit an interpretation of the present invention. In addition, in the specification and each drawing, the same reference symbols are attached to similar elements and elements that have been mentioned in previous drawings, and therefore a detailed explanation may be omitted where appropriate. Furthermore, the characters [first], [second] attached to each element are appropriate symbols used for distinguishing each element and as long as there is no specific explanation do not possess any further meaning.

In the present specification, in the case where certain parts or regions are given as [above (or below)] other parts or regions, as long as there is no particular limitation, these include parts which are not only directly above (or directly below) other parts or regions but also in an upper direction (or lower direction), that is, other structure elements may be included between other parts or regions in an upper direction (or lower direction).

Figure 1:
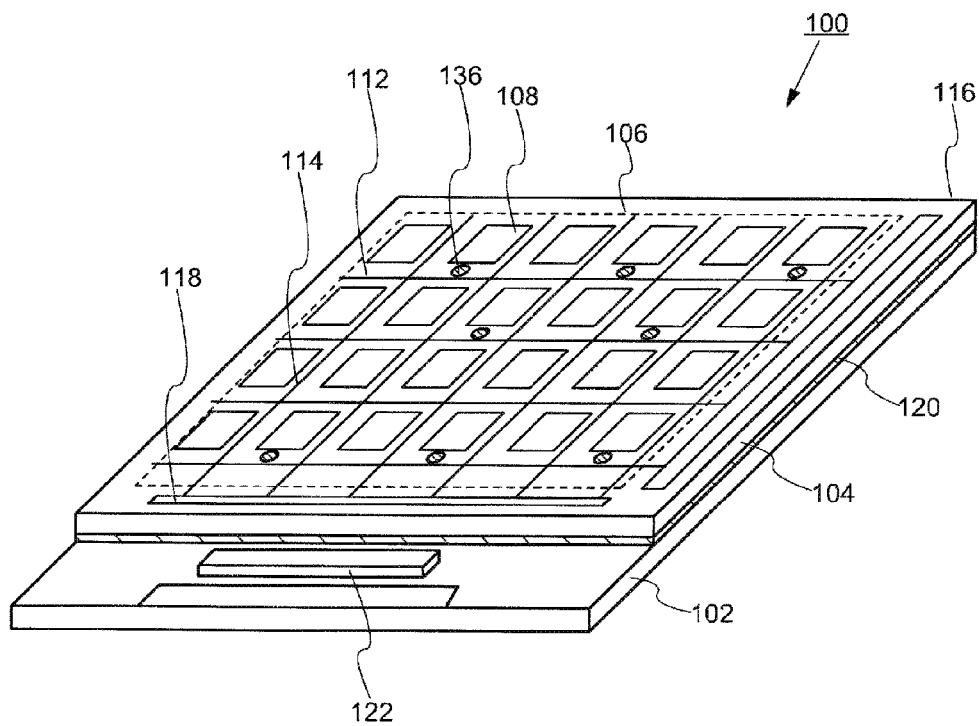
FIG. 1 is a diagram showing a perspective view of a liquid crystal display device related to one embodiment of the present invention.

FIG. 1 shows a perspective view of a liquid crystal display device related to one embodiment of the present invention. The liquid crystal display device 100 is arranged with a first substrate 102 and a second substrate 104. A first main surface of the first substrate 102 and a first main surface of the second substrate 104 are arranged opposing each other.

A pixel part 106 is arranged in this region where the substrates are opposed. A plurality of pixels 108 are arranged in the pixel part 106. In the first substrate 102, a gate drive line circuit 116 and source line drive circuit 118 are arranged in a region on the exterior side of the pixel part 106. The gate line drive circuit 116 outputs a gate signal (scanning signal) to a gate line 112. The source line drive circuit 118 outputs a source signal (video signal) to a source line 114. The gate line drive circuit 116 and source line drive circuit 118 are connected with a drive IC chip 122. The drive IC chip 122 is mounted on the first substrate 102 for example. A spacer 136 is arranged between the first substrate 102 and second substrate 104. The first substrate 102 and second substrate 104 are bonded together by a sealing member 120. A liquid crystal layer is arranged in a gap part between the first substrate 102 and second substrate 104 interposed by the spacer 136.

In the present embodiment, unless otherwise noted the spacer 136 is assumed to be a column shaped spacer. That is, the spacer 136 is formed on the second substrate 104 side and the second substrate 104 is bonded with the first substrate 102. In addition, the spacer 136 which is arranged on a surface where the second substrate 104 faces the first substrate 102 includes a shape which projects in a column shape.

Figure 2:
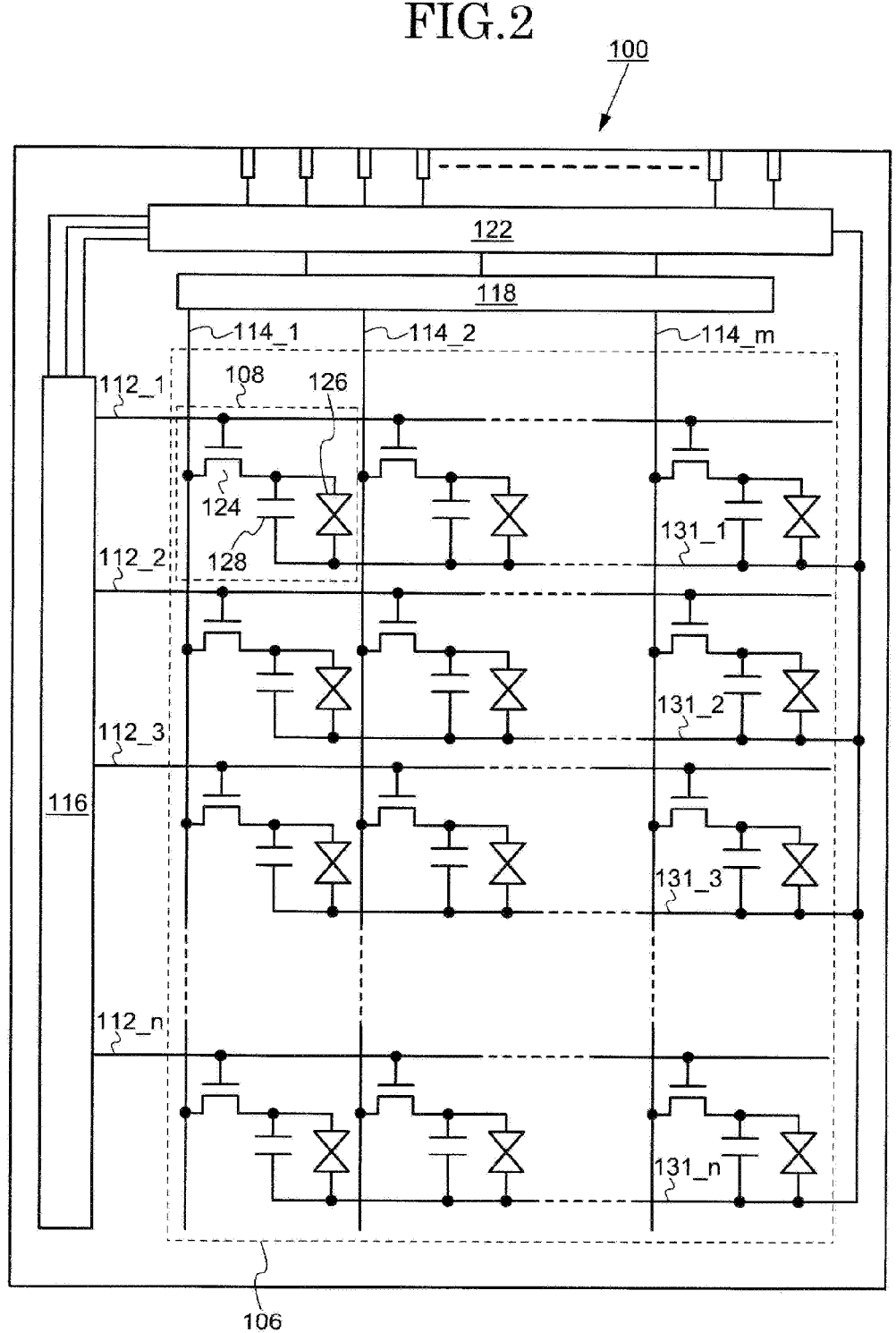
FIG. 2 is a diagram for explaining a structure of a liquid crystal display device related to one embodiment of the present invention.

FIG. 2 shows a structure of a pixel part and a drive circuit part in the liquid crystal display device 100. For example, the pixel part 106 is arranged with m number of source lines 114 (114_1~114_m) and n number of gate lines 112 (112_1~112_n). m×n number of pixels 108 are arranged in a matrix shape in the pixel part 106 (however, m and n are positive integers). The pixel part 108 includes a switching element 124, a liquid crystal element 126 and storage capacitor 128. The switching element 124 is connected to the gate line 112 and source line 114. One terminal of the liquid crystal element 126 and storage capacitor 128 is connected to the switching element 124 and the other terminal is connected to a common electrode 131. The common electrode 131 is arranged in common across a plurality of pixels 108. Each of the gate lines 112 (112_1~112_n) is connected to the gate line drive circuit 116. In addition, each of the source lines 114 (114_1~114_m) is connected to the source line drive circuit 118.

In the present embodiment, the pixel part 106 includes a structure which can be applied to a FFS (fringe field switching) mode or IPS (In Plane Switching) mode. The liquid crystal display device 100 having this structure mainly uses a transverse electric field (for example, an electric field almost parallel with a main surface of a substrate among a fringe electric field) formed between a pixel electrode and common electrode, and the orientation of a liquid crystal molecules which form a liquid crustal layer is controlled.

Figure 3:
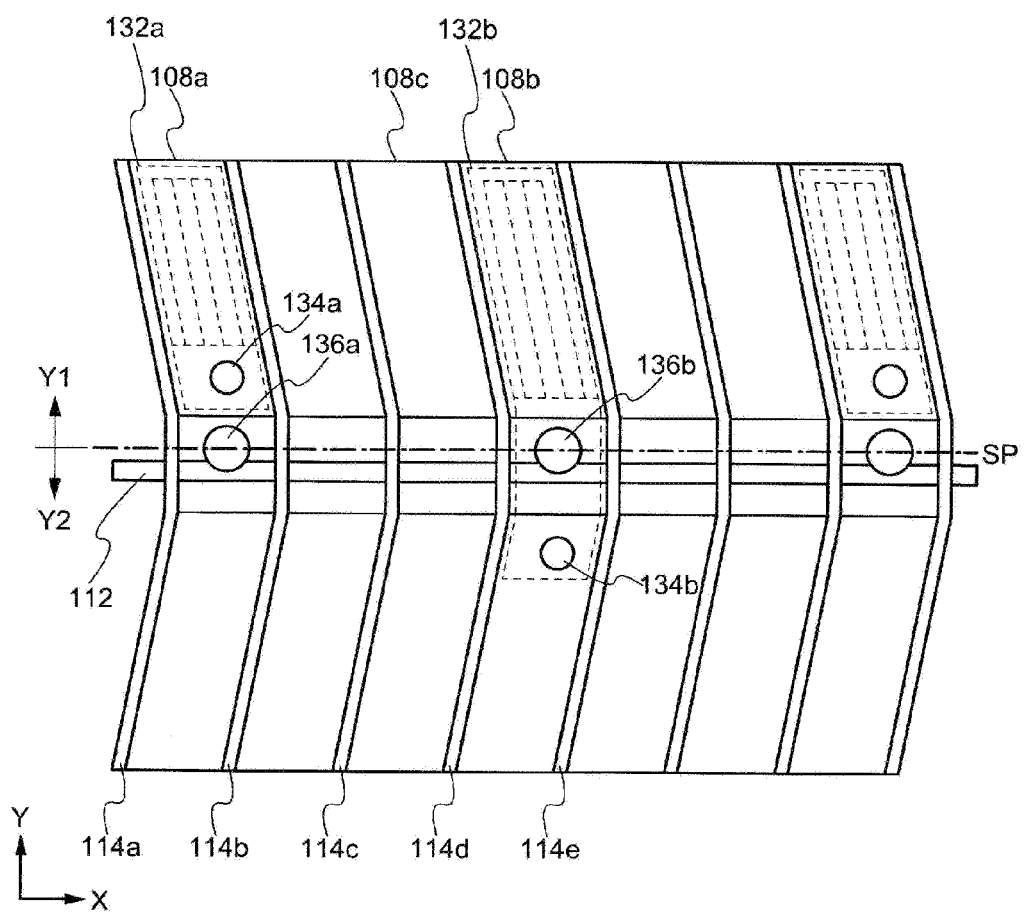
FIG. 3 is a planar view diagram for explaining a structure of a pixel part in a liquid crystal display device related to one embodiment of the present invention.

FIG. 3 schematically shows a pixel arrangement and a spacer arrangement in the pixel part 106. The gate line 112 and source line 114 are arranged in the pixel part 106. The gate line 112 is arranged in a first direction (for example, X direction shown in FIG. 3). The source line 114 is arranged in a second direction (for example, Y direction shown in FIG. 3) intersecting the first direction. In addition, the spacer 136 is arranged in a number of pixels included in the pixel part 106. In the example shown in FIG. 3, a first spacer 136a is arranged in a first pixel 108a, a second spacer 136b is arranged in a second pixel 108b, and a spacer is not arranged in a third pixel 108c between the first pixel 108a and second pixel 108b.

The spacer 136 is arranged in straight line in the first direction along the gate line 112. In the first pixel 108a, the first spacer 136a is arranged between the source line 114a and source line 114b. In the second pixel 108b, the second spacer 136b is arranged between a source line 114d and source line 114e.

The first pixel 108a includes a first pixel electrode 132a. The second pixel 108b includes a second pixel electrode 132b. The first pixel electrode 132a is electrically connected with a switching element belonging to the first pixel 108a via a first contact hole 134a. The second pixel electrode 132b similarly is electrically connected with a switching element belonging to the second pixel 108b via a second contact hole 134b. A position of the first contact hole 134a in the first pixel 108a and a position of the second contact hole 134b in the second pixel 108b are different. That is, the first contact hole 134a and second contact hole 134b are alternately arranged with respect to a straight line SP in a first direction where the first spacer 136a and second spacer 136b. Specifically, as is shown in FIG. 3, the first contact hole 134a is arranged in a Y1 direction side and the second contact hole 134b is arranged in a Y2 direction side with the straight line SP where the first spacer 136a and second spacer 136b are arranged as a reference line. The first contact hole 134a and second contact hole 134b include a shape which is substantially line symmetrical with respect to the straight line SP where the spacer 136 is arranged in a first direction. Furthermore, substantially means including a shape resembling a line symmetrical shape and including the same characteristics since it is difficult to be accurately formed line symmetrically during manufacture. As a positional relationship, when the first contact hole 134a is arranged in one side (Y1 direction side) with respect to the first spacer 136a, the second contact hole 134b is arranged in an opposite side (Y2 direction side) with respect to the second spacer 136b. In the liquid crystal display device related to the present embodiment, an alignment margin between the first substrate and second substrate is secured by alternately arranging contact holes of a pixel electrode with respect to the arrangement of a spacer aligned in a straight line in one direction.

Furthermore, the third pixel 108c is arbitrary with respect to the arrangement of a contact hole. For example, a contact hole of the third pixel 108c is similarly arranged as the first contact hole 134a of the first pixel 108a. In addition, a form is shown in FIG. 3 in which the first spacer 136a is arranged in the first pixel 108a and the second spacer 136b is arranged in the second pixel 108b sandwiching two pixels. The arrangement interval of spacers in the pixel part is not limited to the case of being arranged for every three pixels but may be arranged as appropriate. For example, a spacer may be arranged for every twenty pixels and in this case, the relationship between the arrangement of the first spacer 136a with respect to the first contact hole 134a and the arrangement of the second spacer 136b with respect to the second contact hole 134b may be an arrangement which meets the relationship shown above.

In the pixel part 106 shown in FIG. 3, the first pixel 108a, second pixel 108b and third pixel 108c include a color filter layer. A color filer opposing the first pixel electrode 132a in the first pixel 108a may have the same color as a color filter which opposes the second pixel electrode 132b in the second pixel electrode 108b. For example, the first pixel 108a and second pixel 108b may be pixels which oppose a red color filter layer or a blue color filter. In this case, even if a slight difference is produced in a pixel aperture ratio between two pixels, due to the difference in the layout of the first contact hole 134a and the second contact hole 134b, it is possible to reduce the effects on image quality since luminosity sensitivity of red and blue is low compared to green.

In addition, the color of a color filter layer opposing the first pixel electrode 132a in the first pixel 108a and a color of a color filter layer opposing the second pixel electrode 132b in the second pixel 108a may be different respectively. For example, one of either the first pixel 108 and second pixel 108b may be a pixel opposing a red color filter layer and the other may be a pixel opposing a blue color filter layer. In this case, even if a slight difference is produced in a pixel aperture ratio between two pixels, due to the difference in the layout of the first contact hole 134a and the second contact hole 134b, it is possible to reduce the effects on image quality since luminosity sensitivity of red and blue is low compared to green.

In the pixel part 106 shown in FIG. 3, a color filter layer opposing the first pixel electrode 132a of the first pixel 108a may be the same color as a color filter layer opposing a pixel electrode of another pixel arranged in a second direction with respect to the first pixel 108a, and may also be a different color to a color filter layer opposing a pixel electrode of a third pixel adjacent in a first direction with respect to the first pixel 108a. That is, it is possible to achieve high definition of a pixel by arranging color filter layers in a stripe arrangement.

In addition, a color filter layer opposing the first pixel electrode 132a of the first pixel 108a may also be a different color to both a color filter layer opposing a pixel electrode of another pixel arranged in a second direction with respect to the first pixel 108a and a color filter layer opposing a pixel electrode of the third pixel adjacent in a first direction with respect to the first pixel 108a. That is, color filter layers may have a diagonal arrangement or a delta arrangement.

Figure 4:
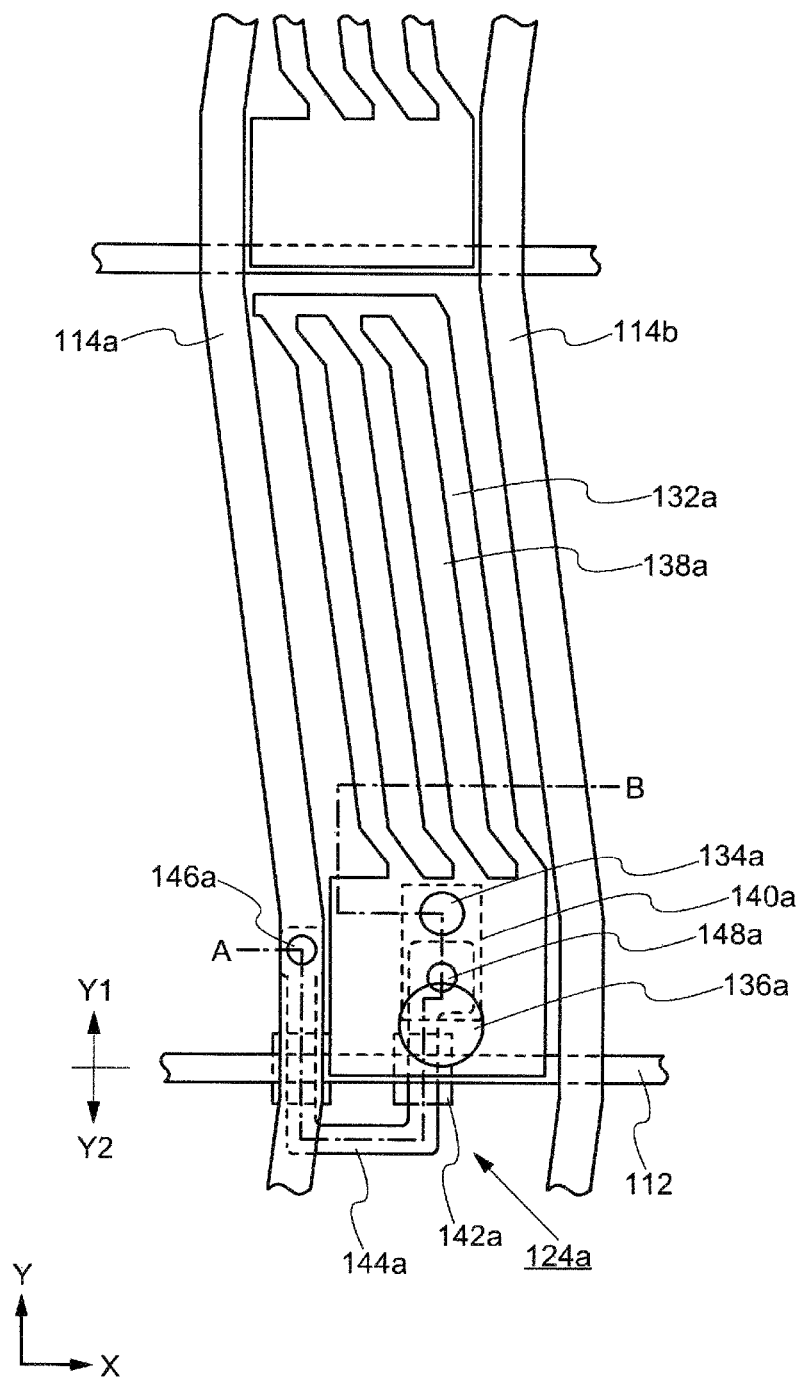
FIG. 4 is a planar view diagram showing a structure of a pixel in a liquid crystal display device related to one embodiment of the present invention.

Next, the first pixel 108a, second pixel 108b and third pixel 108c are explained in detail while referring to the diagrams. FIG. 4 shows a roughly plan view of a structure of the first pixel 108a seen from the second substrate 104 side. Furthermore, only parts necessary for the explanation are exemplified here.

The gate line 112 is arranged along a first direction (for example, X direction shown in FIG. 4). The source line 114 is arranged along a second direction (for example, Y direction shown in FIG. 4) which intersects the first direction. The switching element 124 is arranged near where the gate line 112 and source line 114 intersect. The first switching element 124a is realized, for example, by a thin film transistor formed with a channel in a semiconductor film. At least a part of a first semiconductor layer 144a of the first switching element 124a intersects the gate line 112 via an insulation layer. The gate line 112 functions substantially as a gate electrode at an intersection part with the first semiconductor layer 144a. In FIG. 4, a strip shaped first semiconductor layer 144a bends twice and intersects the gate line 112 twice. That is, the first switching element 124a includes a multi-gate type structure in which two gate electrodes are interposed between a pair of source regions and drain regions as a thin film transistor. One region corresponding to a source region in the first semiconductor layer 144a is electrically connected to the source line 114a via a source contact hole 146a, and another region corresponding to a drain region is electrically connected to a drain electrode 140a via a first drain contact hole 148a. In addition, the drain electrode 140a is electrically connected to the first pixel electrode 132a via the first contact hole 134a.

Furthermore, although FIG. 4 shows a form whereby the semiconductor layer 144a having a U character shape intersects the gate line 112, the present invention is not limited to this form. The semiconductor layer 144a forming a thin film transistor may have various shapes such as an I character shape and the like. In addition, a thin film transistor which is used as a switching element 124 is not limited to a multi-gate structure and may also have a single-gate structure. In addition, in the case of a multi-gate structure, the thin film transistor is not limited to two or more channels arranged in series between a source and drain as described above but may also be arranged with a gate electrode arranged in parallel.

In addition, a light blocking layer 142a is arranged in a region where the first semiconductor layer 144a overlaps the gate line 112. The light blocking layer 142a is arranged in a lower layer than the first semiconductor layer 144a. The light blocking layer 142a is arranged so that he light of a backlight is not irradiated to a channel region of the first semiconductor layer 144a.

Furthermore, in the first switching element 124a, the first semiconductor layer 144a is formed using polysilicon, amorphous silicon or a semiconductor oxide. In addition, although the first switching element 124a may be either a top gate type or bottom gate type, in the present example a top gate type is employed.

The first pixel electrode 132a is formed in an island shape corresponding to the shape of the pixel 108a. In the example shown in FIG. 4, the first pixel electrode 132a is formed in a roughly rectangular shape having a short side along a first direction (X direction) and a long side in a second direction (Y direction). A plurality of slits 138a is formed in this type of first pixel electrode 132a. In the example shown in FIG. 4, each of the slits 138a extends along the second direction (Y direction). A slit 138a in the first pixel electrode 132a is arranged between a source line 114a and an adjacent source line 114b. Furthermore, although not shown in FIG. 4, a common electrode is formed via an insulation layer on a lower layer of the pixel electrode 132a. By providing the first pixel electrode 132a with a slit 138a, an electric field which is generated between the first pixel electrode 132a and a common electrode operates in a liquid crystal layer arranged above the first pixel electrode 132a.

Figure 5:
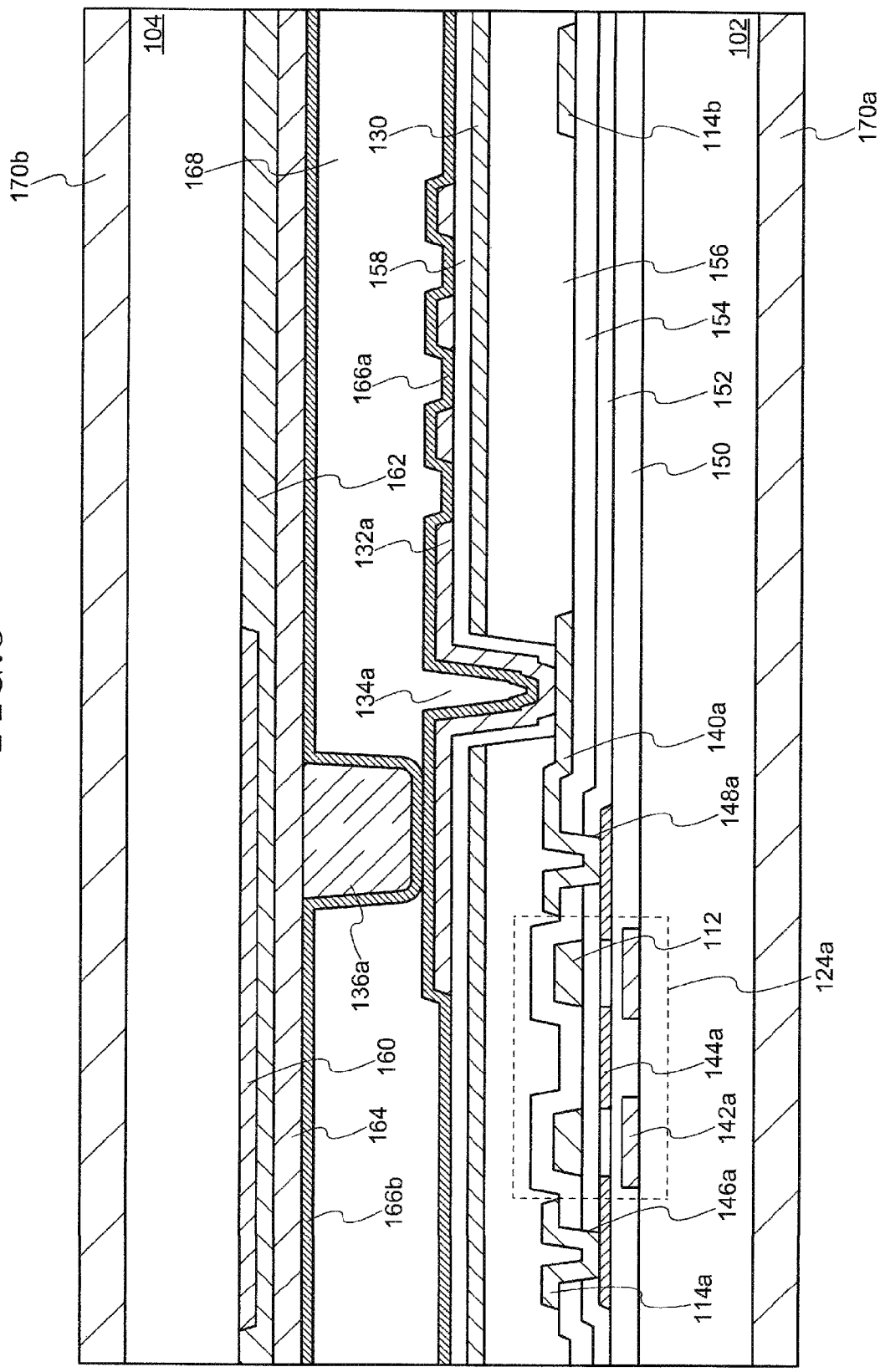
FIG. 5 is a cross-sectional diagram showing a structure of a pixel in a liquid crystal display device related to one embodiment of the present invention.

FIG. 5 shows a cross-sectional structure of a pixel 108 along the line A-B shown in FIG. 4. The main components which form a pixel 108 are arranged within a surface where the first substrate 102 and second substrate 104 oppose each other. The first switching element 124a, first pixel electrode 132a and common electrode 130 are arranged in the first substrate 102, and the first spacer 136a, light blocking layer 160 and color filter layer 162 and the like are formed in the second substrate 104.

The first semiconductor layer 144a of the first switching element 124a is arranged above the first substrate 102 via the first insulation layer 150. A second insulation layer 152 is arranged on an upper surface of the first semiconductor layer 144a. A gate line 112 overlaps the first semiconductor layer 144a via the second insulation layer 152. This overlapping part functions as a gate electrode and a gate insulation film in a transistor which functions as the first switching element 124a. Furthermore, a light blocking layer 142a is arranged on a lower layer of the first insulation layer 150 corresponding to the overlapping part.

A gate line 112 is buried by a third insulation layer 154. Source lines 114a, 114b and drain electrode 140 are arranged above the third insulation layer 154. The source line 114a is connected with a source region of the first semiconductor layer 144a via the first source contact hole 146a which passes through the second insulation layer 152 and third insulation layer 154. The drain electrode 140 is connected with a drain region of the first semiconductor layer 144a via the first drain contact hole 148a which passes through the second insulation layer 152 and third insulation layer 154.

A fourth insulation layer 156 is arranged on an upper layer of the source lines 114a, 114b and drain electrode 140. The fourth insulation layer 156 is arranged as a planarized film. The fourth insulation layer 156 is formed, for example, from a resin material such as acrylic or polyimide. A common electrode 130 is arranged above the fourth insulation layer 156. The common electrode 130 is not exposed in the first contact hole 134a formed in the fourth insulation layer 156. The common electrode 130 is formed from a transparent conductive material, for example, indium/tin/oxide ITO) or indium/zinc/oxide (IZO). A fifth insulation layer 158 is arranged above the common electrode 130. The fifth insulation layer 158 covers a side wall surface of the first contact hole 134a formed in the fourth insulation layer 156 and is arranged so that the common electrode 130 is not exposed. Furthermore, the fifth insulation layer 158 is formed, for example, from silicon nitride.

The first pixel electrode 132a is arranged above the fifth insulation layer 158 and overlaps the common electrode 130. The first pixel electrode 132a is connected to the drain electrode 140 via the first contact hole 134a which passes through the fourth insulation layer 156. Furthermore, the fifth insulation layer 158 which covers a side wall surface of the first contact hole 134a is open at the bottom surface (or upper surface of the drain electrode 140) of the first contact hole 134a. The drain electrode 140 is exposed from this opening. In this way, the first pixel electrode 124a is electrically connected with the first switching element 124a. As mentioned previously, a slit 138a is arranged in the first pixel electrode 132a. The first pixel electrode 132a is formed, for example, from a transparent conductive material such as ITO or IZO and the like.

The first pixel electrode 132a is covered by a first orientation film 166a. In addition, the first orientation film 166a covers the fifth insulation layer 158. The first orientation film 166a is formed from a material which exhibits horizontal orientation properties and is arranged in a surface where the first substrate opposes the liquid crystal layer 168.

The second substrate 104 is arranged with the light blocking layer 160, color filter layer 162, overcoat layer 164 and first spacer 136a in a surface which opposes the first substrate 102. The light blocking layer 160 is arranged to oppose a region of the switching element 124, gate line 112 and source line 114 which arranged in the first substrate 102, and encloses and partitions an outline of a pixel 108. In addition, the light blocking layer 160 is also arranged to oppose a region of the spacer 136 and first contact hole 134a.

The color filter layer 162 is arranged so as to overlap at least the first pixel electrode 132a and one part is further overlapped by the light blocking layer 160. The color filter layer 162 has a different color scheme arrangement corresponding to each pixel, for example, three primary colors of red, blue and green and is formed by a resin material colored with each color. The boundary of a color filter of an adjacent pixel is located in a region which overlaps the light blocking layer 160.

The overcoat layer 164 covers the color filter layer 162. The overcoat layer 164 planarizes non-uniformity of a surface formed by the light blocking layer 160 or color filter layer 162. The overcoat layer 164 is formed from a transparent resin material. In addition, the overcoat layer 164 is covered by a second orientation film 166b. The second orientation film 166b is formed from a material that exhibits horizontal orientation properties and is arranged in a surface where the second substrate 104 opposes the liquid crystal layer 168.

The first spacer 136a is arranged in the second substrate 104. A fixed interval (cell gap) between the first substrate 102 and the second substrate 104 is maintained using the first spacer 136a. Furthermore, the first substrate 102 and second substrate 104 are bonded together by a sealing member as shown in FIG. 1 with the spacer interposed between the substrates. The liquid crystal layer 168 is formed from a liquid crystal compound included liquid crystal molecules arranged between the first orientation film 166a of the first substrate 102 and the second orientation film 166b of the second substrate 104.

Furthermore, as is shown in FIG. 5, the first contact hole 134a formed in the first substrate 102 is arranged close to the first spacer 136a formed in the second substrate 104. It is desirable that a region arranged with the first contact hole 134a which does not directly contribute to the orientation of liquid crystals, and a region arranged with the first spacer 136a are arranged as close together as possible in order to improve an aperture ratio of a pixel. In this case, when the first substrate 102 and the second substrate 104 are bonded together, the first spacer 136a sometimes falls into the first contact hole 134a due to misalignment. In this case, a problem is produced whereby a constant cell gap between the first substrate 102 and second substrate 104 is no longer maintained. However, in the present embodiment, as is shown in FIG. 3, since contact holes of a pixel electrode are alternately arranged with respect to the arrangement of a spacer, a constant cell gap between the substrates is maintained even in the case where the positions of the first substrate 102 and second substrate 104 are misaligned in one direction (specifically, the Y direction shown in FIG. 3) when bonding.

A first optical element 170a including a first polarization plate is arranged in an outer surface of the first substrate 102. In addition, a second optical element 170b including a second polarization plate is arranged in an outer surface of the second substrate 104. A first polarizing axis (or first absorption axis) of the first polarization plate and a second polarizing axis (or second absorption axis) of the second polarization plate are in a crossed nicol positional relationship.

As is shown in FIG. 5, the first orientation film 166a and second orientation film 166b mutually undergo an orientation process (for example, rubbing process or photo orientation process) in a parallel direction within a surface parallel to a main surface of a substrate (or X-Y plane). The first orientation film 166a undergoes an orientation process along a direction intersecting an acute angle of 45° or less with respect to the length axis of a slit 138a (second direction Y in the example shown in FIG. 4). For example, the orientation process direction of the first orientation film 166a is a direction which intersects at an angle of 5°~15° with respect to a second direction (Y direction) in which the slit 138a extends. In addition, the second orientation film 166b undergoes an orientation process along a direction parallel to the orientation process direction of the first orientation film 166a. The orientation process direction of the first orientation film 166a and the orientation process direction of the second orientation film 166b are mutually in opposite directions. At this time, the first polarizing axis of the first polarization plate is set, for example, in a direction parallel to the orientation process direction of the first orientation film 166a, and the second polarizing axis of the second polarization plate is set in a direction orthogonal to the orientation process direction of the first orientation film 166a.

In the liquid crystal display device 100, a backlight is arranged on the first substrate 102 side. Various forms may be applied as the backlight such as a backlight which uses a light emitting diode (LED) as a light source or a cold cathode tube lamp (CFFL). An explanation with respect to the detailed structure of a backlight is omitted.

Referring again to FIG. 4, in the first pixel 108a, the first spacer 136a, first drain contact hole 148a and first contact hole 134a are arranged along a second direction (Y direction). By adopting a layout in which the first drain contact hole 148a is arranged between the first contact hole 134a and first spacer 136a in this way, a layout margin can be provided by increasing the interval between the first contact hole 134a and first spacer 136a by effectively utilizing the area taken up by a contact hole.

Figure 6:
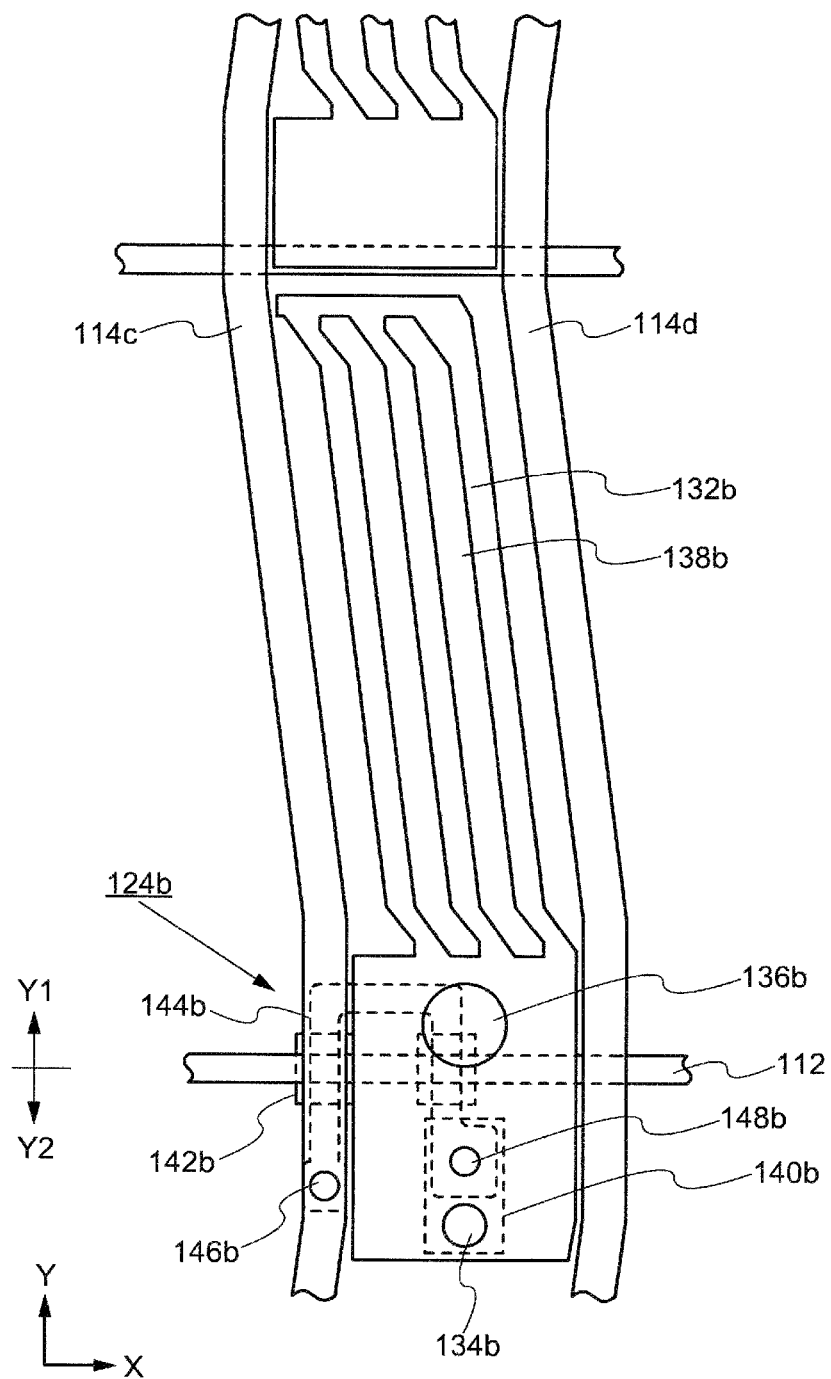
FIG. 6 is a planar view diagram showing a structure of a pixel in a liquid crystal display device related to one embodiment of the present invention.

FIG. 6 shows a schematic planar view diagram of the structure of a second pixel 108b seen from the second substrate 104 side. The second pixel 108b includes a second switching element 124 and second pixel electrode 132b the same as the first pixel 108a, and is arranged with a second spacer 136b. Here, parts which are different to the first pixel 108a are explained.

In the second pixel 108b, the shape of the second semiconductor layer 144a of the second switching element 124b and the shape of the first semiconductor layer 144a of the first switching element 124a have a substantially line symmetrical relationship with respect to the gate line 112. That is, the shape of the second semiconductor layer 144b of the second switching element 124b and the shape of the first semiconductor layer 144a of the first switching element 124a are the same. In the first pixel 108a, the first source contact hole 146a of the first switching element 124a is arranged in the direction Y1 in the second direction where the source line 114 extends with the gate line 112 as a reference. On the other hand, in the second pixel 108b, the second source contact hole 146b of the second switching element 124b is arranged in the direction Y2 in the second direction where the source line 114d extends with the gate line 112 as a reference. In this way, the second semiconductor layer 144b of the second switching element 124b is arranged in a shape in which the first semiconductor layer 144a of the first switching element 124a is inverted with respect to the gate line 112. Therefore, the arrangement of the second contact hole 134a is also displaced in the Y2 direction with the gate line 112 as a reference.

In this way, by making the relationship between the shape of the first semiconductor layer 144a and the shape of the second semiconductor layer 144b an inverted relationship with a gate line at the center, it is possible to achieve uniformity of transistor characteristics. For example, in the case where a semiconductor layer is polysilicon crystalized by a line shaped laser beam, since it is possible to align the growth direction of a crystal between the first switching element 124a and second switching element 124b, it is possible to achieve uniformity in characteristics.

Furthermore, although the pattern and layout of such a semiconductor layer is shown as a preferred form of the present embodiment, the present invention is not limited to this form. If the form of a semiconductor layer in the first switching element 124a and second switching element 124b satisfies the positional relationship between the first contact hole 134a and first spacer 136a in the first pixel 108a, and the positional relationship between the second contact hole 124b and second spacer 136b in the second pixel 108b, then other forms may also be employed. That is, the pattern and layout of the first semiconductor layer 144a of the first switching element 124a and the second semiconductor layer 144b in the second switching element 124b may also be respectively different.

The second pixel 108b is arranged with the second contact hole 134b, second drain contact hole 148b, and second spacer 136b in sequence along a second direction (Y direction). A slit 138b of the second pixel electrode 132b is arranged between the source line 114c and source line 114d the same as the first pixel 108a. Therefore, because the positional relationship between the second contact hole 134b and second spacer 136b is inverted with respect to the positional relationship between the first contact hole 134a and first spacer 136a, the length of the second pixel electrode 132b in the second direction is larger than the length of the first pixel electrode 132a. In this way, by making the length of a pixel electrode between the first pixel 108a and second pixel 108b different, it is possible to make the position of a contact hole in a pixel electrode sandwiching a gate line 112 different.

As is shown in FIG. 4, the first pixel 108a arranged with the first spacer 136a and first contact hole 134a, and the second pixel 108b arranged with the second contact hole 134b and second spacer 136b along a second direction are alternately arranged in the pixel part 106 at certain intervals. In this way, when the first substrate 102 and second substrate 104 are bonded together, even in the case where there is misalignment in the second direction, it is possible to prevent all the spacers from falling into a contact hole of a pixel electrode. In this way, it is possible to maintain an interval, that is, maintain a cell gap at a fixed interval between the first substrate 102 and second substrate 104. Since it is possible to maintain a cell gap at a fixed interval by securing a bonding margin while achieving high definition of a pixel in this way, it is possible to reduce variation in optical characteristics.

Figure 7:
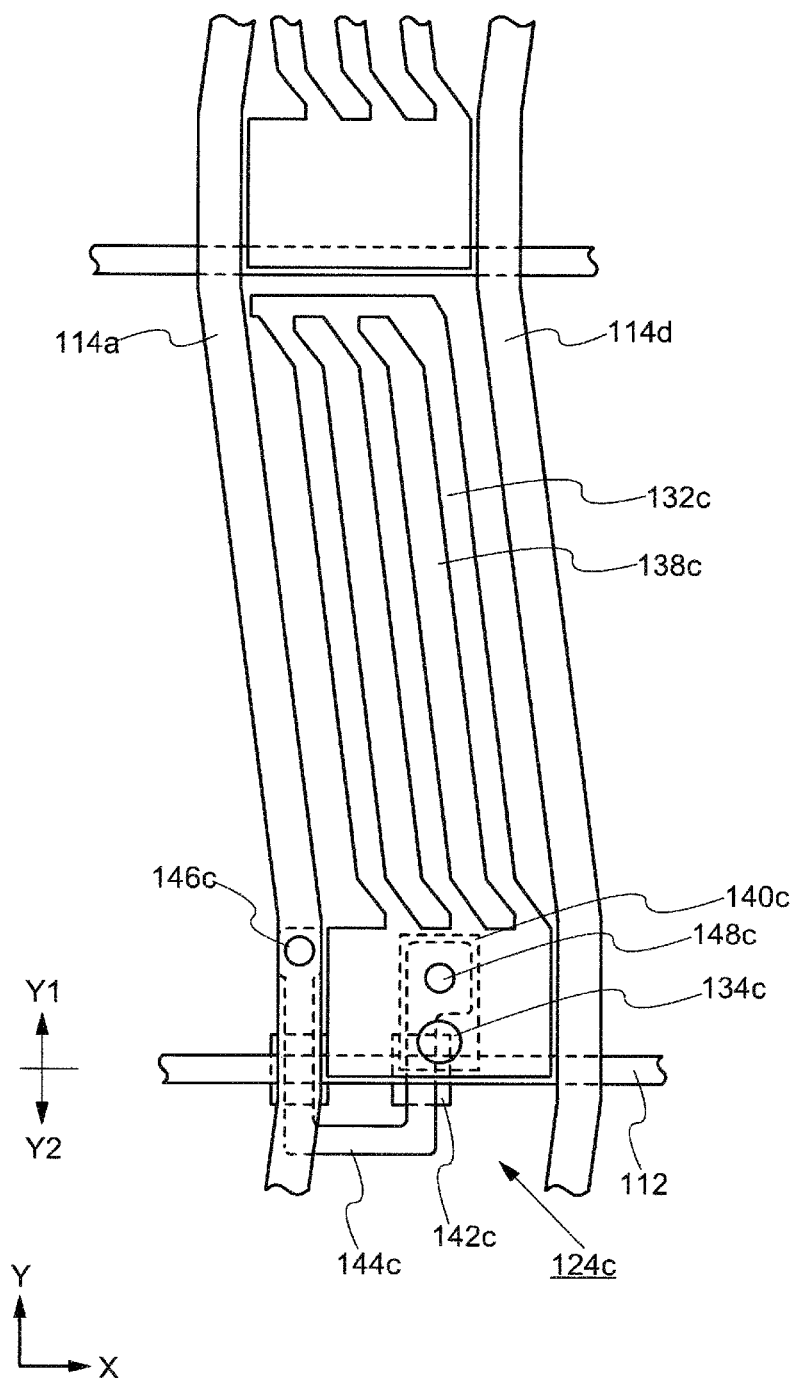
FIG. 7 is a planar view diagram showing a structure of a pixel in a liquid crystal display device related to one embodiment of the present invention.

FIG. 7 shows a roughly planar view diagram of a structure of the third pixel 108c arranged with a spacer seen from the second substrate 104 side. The third pixel 108c is arranged with a third switching element 124c and third pixel electrode 132c the same as the first pixel 108a. Parts which are different to the first electrode 108a are explained.

The position of the contact hole 134c in the third pixel 108c is different compared to the first pixel 108a. That is, the position of the third contact hole 134c in the third pixel electrode 132c is arranged on the side of the gate line 112 with respect to the third drain contact hole 148. As a result, the length of a slit 138c arranged in the third pixel electrode 132c is longer compared to that in the first pixel electrode 132a. In this way, the effective area of a pixel is substantially increased which contributes to an improvement in an aperture ratio.

Furthermore, although FIG. 7 shows the case where the pattern and layout of the third semiconductor layer 144c in the third pixel 108c is the same as the pattern and layout of the first semiconductor layer 144a in the first pixel 108a, the present invention is not limited to this. For example, the pattern and layout of the third semiconductor layer 144c may be the same as that in the semiconductor layer 144b. In addition, the pattern and layout of the third semiconductor layer 144c may also be different to the first semiconductor layer 144a in the first pixel 108a and second semiconductor layer 144b in the second pixel 108b.

Figure 8:
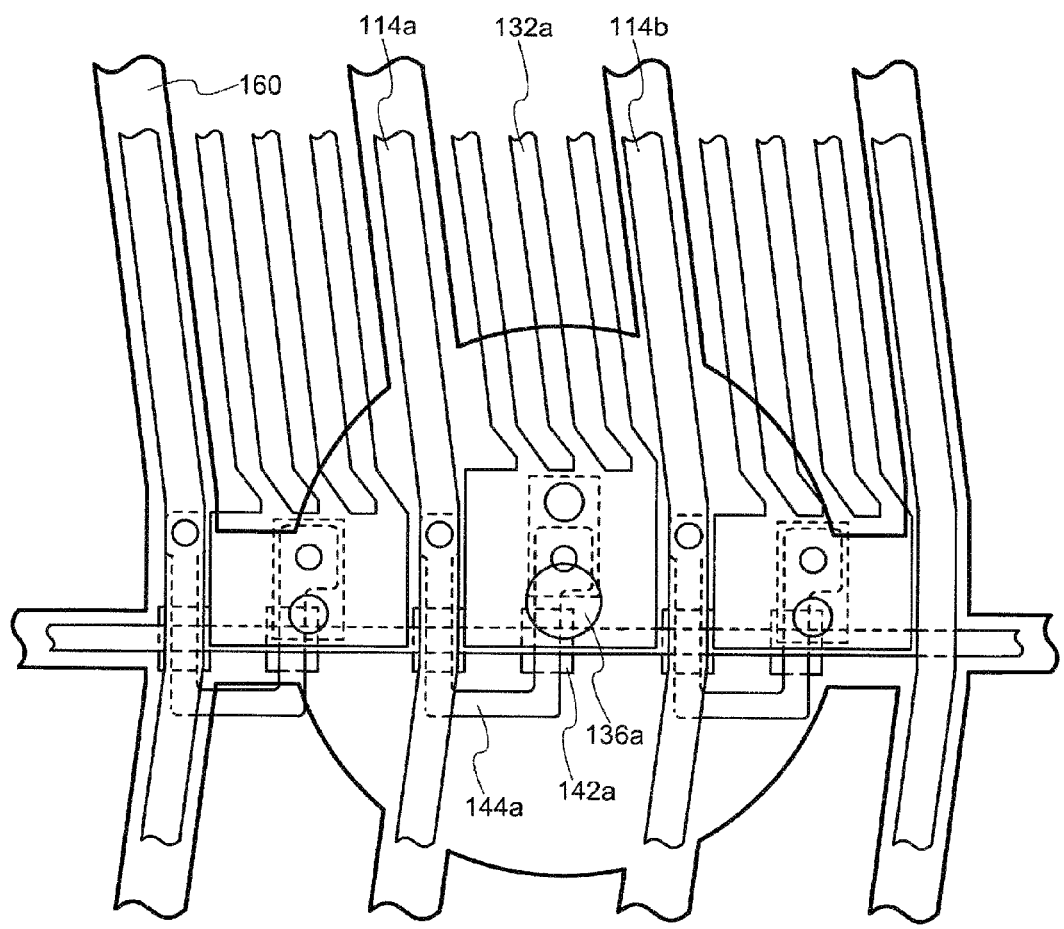
FIG. 8 is a planar view diagram showing a structure of a pixel and a light blocking layer in a liquid crystal display device related to one embodiment of the present invention.

FIG. 8 shows a roughly planar view diagram of the layout of the light blocking layer 160 arranged in the second substrate 104 seen from the second substrate 104 side. FIG.

8 shows an arrangement of the first pixel 108a and the third pixel 108c adjacent to the first pixel 108a. The light blocking layer 160 extends in the first direction and second direction so as to cover the gate line 112 and source line 114. Furthermore, the light blocking layer 160 includes a spacer light blocking part which blocks the first spacer 136a. The spacer light blocking part blocks a part of each of six pixels (including the first pixel 108a) which enclose the first spacer 136a. The light blocking layer 160 includes a circular shaped light blocking pattern as the spacer light blocking part with the position of the first spacer 136a at roughly the center.

Assuming that an orientation process defect region is formed with the first spacer 136a as a starting point, it is possible to suppress light leakage from the periphery of the first spacer 136a using the circular shaped pattern of the light blocking layer 160. In addition, even if the position of the first spacer 136a is misaligned, since light from the periphery of the first spacer 136a is blocked by the light blocking layer 160 throughout a wide range, it is possible to suppress light leakage. Therefore, it is possible to suppress a decrease in a contrast ratio and a decrease in display quality. The form of the light blocking layer 160 operates effectively when a pixel is a high definition pixel. Furthermore, the same is true for the second pixel 108b arranged with the second spacer 136b.

In the scope of the concept of the present invention, a person ordinarily skilled in the art could conceive of various modification or improvement examples and such modification or improvement examples are understood to belong to the scope of the present invention. For example, with respect to each of the embodiments described above, a person ordinarily skilled in the art could appropriately perform an addition or removal of structural components or design modification or an addition of processes or an omission or change in conditions which are included in the scope of the present invention as long as they do not depart from the subject matter of the present invention.

What is claimed is:

1. A liquid crystal display device comprising:
    a gate line arranged along a first direction;
    a first pixel including a first switching element connected to the gate line, and a first pixel electrode connected to the first switching element via a first contact hole arranged in an insulation layer;
    a second pixel including a second switching element connected to the gate line, and a second pixel electrode connected to the second switching element via a second contact hole arranged in the insulation layer;
    a first spacer arranged in the first pixel; and
    a second spacer arranged in the second pixel,
    wherein the first spacer and the second spacer are arranged substantially on the same straight line in the first direction,
    the first contact hole and the second contact hole are alternately arranged sandwiching a straight line connecting the first spacer and the second spacer,
    the first pixel electrode and the second pixel electrode extend in a second direction intersecting the first direction, and
    a length of the second pixel electrode extending in the second direction is longer than a length of the first pixel electrode extending in the second direction.

2. The liquid crystal display device according to claim 1 further comprising:
    a first substrate arranged with the first pixel and the second pixel; and
    a second substrate arranged with the first spacer and the second spacer,
    wherein the first substrate and the second substrate are arranged opposed to each other.

3. The liquid crystal display device according to claim 2, wherein the second substrate includes a color filter layer, and
    a color filter layer opposing the first pixel electrode has the same color as a color filter layer opposing the second pixel electrode.

4. The liquid crystal display device according to claim 2, wherein the second substrate includes a color filter layer, and
    a color filter layer opposing the first pixel electrode has a different color to a color filter layer opposing the second pixel electrode.

5. The liquid crystal display device according to claim 2, wherein the second substrate includes a color filter layer,
    a color filter layer opposing the first pixel electrode has the same color as a color filter layer opposing a pixel electrode of another pixel arranged in a second direction intersecting the first direction with respect to the first pixel, and
    a color filter layer opposing the first pixel electrode has a different color to a color filter layer opposing a pixel electrode of a third pixel adjacent in the first direction.

6. The liquid crystal display device according to claim 2, wherein the second substrate includes a color filter layer, and
    a color filter layer opposing the first pixel electrode has a different color to a color filter layer opposing a pixel electrode of another pixel arranged in a second direction intersecting the first direction with respect to the first pixel.

7. The liquid crystal display device according to claim 1 further comprising:
    a plurality of source lines arranged along the second direction,
    wherein a first source line included in the plurality of source lines is connected with the first switching element of the first pixel,
    a second source line included in the plurality of source lines is connected with the second switching element of the second pixel,
    the first spacer is arranged between the first source line and a source line of a pixel adjacent to the first pixel, and
    the second spacer is arranged between the second source line and a source line of a pixel adjacent to the second pixel.

8. The liquid crystal display device according to claim 1 further comprising:
    a light blocking layer enclosing the first pixel and the second pixel,
    wherein the light blocking layer includes a spacer light blocking part in which the first spacer and the second spacer overlap, and
    the spacer light blocking part covers at least a part of a pixel adjacent to each of the first pixel and the second pixel respectively.

9. The liquid crystal display device according to claim 8, wherein the light blocking layer includes a first spacer light blocking part overlapping the first spacer, and a second spacer light blocking part overlapping the second spacer, the first spacer light blocking part covers at least a part of each of six pixels enclosing the first pixel and the first pixel is included in the six pixels, and the second spacer light blocking part covers at least a part of each of six pixels enclosing the second spacer and the second pixel is included in the six pixels.

10. The liquid crystal display device according to claim 1 further comprising:

one or more third pixels between the first pixel and the second pixel, wherein the third pixel includes a third switching element connected with the gate line, and a third pixel electrode connected with the third switching element via a third contact hole arranged in an insulation layer, and the third contact hole is arranged closer to the gate line than the first contact hole and second contact hole.

11. The liquid crystal display device according to claim 10, wherein a spacer is not arranged in the third pixel.

* * * * *